(12) United States Patent
Chen et al.

(10) Patent No.: US 10,440,338 B2
(45) Date of Patent: Oct. 8, 2019

(54) PROJECTION SYSTEM AND METHOD FOR CALIBRATING DISPLAY IMAGE

(71) Applicant: Coretronic Corporation, Hsin-Chu (TW)

(72) Inventors: Yung-Chih Chen, Hsin-Chu (TW); Je-Fu Cheng, Hsin-Chu (TW); Su-Yun Yu, Hsin-Chu (TW); Shu-Hao Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/012,769

(22) Filed: Jun. 20, 2018

(65) Prior Publication Data

US 2018/0376117 A1    Dec. 27, 2018

(30) Foreign Application Priority Data

Jun. 21, 2017 (CN) .......................... 2017 1 0475228

(51) Int. Cl.
*H04N 9/31* (2006.01)
*G06T 3/00* (2006.01)
*G06T 7/60* (2017.01)

(52) U.S. Cl.
CPC ......... *H04N 9/3188* (2013.01); *G06T 3/0068* (2013.01); *G06T 7/60* (2013.01); *H04N 9/3185* (2013.01); *H04N 9/3194* (2013.01)

(58) Field of Classification Search
CPC .. H04N 9/3188; H04N 9/3185; H04N 9/3194; H04N 9/31; G06T 3/0068; G06T 3/00; G06T 3/0093; G06T 7/60

(Continued)

(56) References Cited

U.S. PATENT DOCUMENTS 5,070,407 A    12/1991    Wheeler et al.
5,513,276 A    4/1996    Theodoracatos
(Continued)

FOREIGN PATENT DOCUMENTS

CN    2574073    9/2003
CN    1532715    9/2004
(Continued)

OTHER PUBLICATIONS

"Search Report of Europe Counterpart Application", dated Nov. 23, 2018, p. 1-p. 13.

*Primary Examiner* — Sherrie Hsia
(74) *Attorney, Agent, or Firm* — JCIPRNET (57) ABSTRACT

A projection system and a method for calibrating display image are provided. The method includes: setting a correction image having identification patterns, and establishing first coordinate information of the identification patterns; using a projection device to project the correction image on a display screen; performing an image capturing operation to the correction image and the display screen to obtain a captured image; calculating second coordinate information of the identification patterns in the captured image, and calculating coordinate translation information according to the first coordinate information and the second coordinate information; calculating boundary information of the display screen according to a plurality of boundary coordinate values of the display screen in the captured image and the coordinate translation information, such that the projection device adjusts a size of a projection image for corresponding to the display screen according to the boundary information.

18 Claims, 7 Drawing Sheets

(58) Field of Classification Search
USPC .......... 348/744–747, 806, 807; 382/274–276
See application file for complete search history.

(56) References Cited

U.S. PATENT DOCUMENTS

| | | | |
|---|---|---|---|
| 5,910,816 | A | 6/1999 | Fontenot et al. |
| 6,168,076 | B1 | 1/2001 | Yamamoto et al. |
| 6,330,040 | B1 | 12/2001 | Kawashima |
| 6,618,076 | B1 | 9/2003 | Sukthankar et al. |
| 6,771,272 | B2 | 8/2004 | Deering |
| 7,023,472 | B1 | 4/2006 | Kang et al. |
| 7,084,386 | B2 | 8/2006 | Bernardini et al. |
| 7,137,707 | B2 | 11/2006 | Beardsley et al. |
| 7,215,362 | B2 | 5/2007 | Klose |
| 7,479,982 | B2 | 1/2009 | Otani et al. |
| 7,808,525 | B2 | 10/2010 | Katayama |
| 8,339,464 | B2 | 12/2012 | Germain |
| 8,711,225 | B2 | 4/2014 | Chang et al. |
| 2002/0018139 | A1 | 2/2002 | Yamagata |
| 2003/0210230 | A1 | 11/2003 | Waters |
| 2004/0058729 | A1 | 3/2004 | Shin-Pin |
| 2004/0070669 | A1 | 4/2004 | Aoyama |
| 2008/0062164 | A1 | 3/2008 | Bassi et al. |
| 2008/0284987 | A1 | 11/2008 | Yonezawa |
| 2009/0091711 | A1* | 4/2009 | Rivera .................. G03B 21/00 348/744 |
| 2009/0138233 | A1 | 5/2009 | Kludas et al. |
| 2010/0037273 | A1 | 2/2010 | Dressel et al. |
| 2010/0141775 | A1 | 6/2010 | Vogel |
| 2011/0001881 | A1 | 1/2011 | Kawahara |
| 2011/0007283 | A1 | 1/2011 | Tanaka |
| 2011/0019004 | A1 | 1/2011 | Ohmori et al. |
| 2011/0157353 | A1 | 6/2011 | Takayama et al. |
| 2011/0169778 | A1 | 7/2011 | Nungester et al. |
| 2012/0182416 | A1 | 7/2012 | Kawaguchi |
| 2012/0287298 | A1 | 11/2012 | Kitashou |
| 2013/0235082 | A1 | 9/2013 | Furui |
| 2013/0257813 | A1 | 10/2013 | Chang et al. |
| 2014/0313165 | A1 | 10/2014 | Lam et al. |
| 2015/0103257 | A1 | 4/2015 | Nakashin |
| 2015/0244997 | A1* | 8/2015 | Masuko ............... H04N 9/3179 348/747 |

FOREIGN PATENT DOCUMENTS

| | | |
|---|---|---|
| CN | 1945511 | 4/2007 |
| CN | 102103435 | 6/2011 |
| CN | 102298467 | 12/2011 |
| CN | 103365481 | 10/2013 |
| CN | 104813654 | 7/2015 |
| CN | 105407305 | 3/2016 |
| TW | 578031 | 3/2004 |
| TW | 201020862 | 6/2010 |
| TW | 201611616 | 3/2016 |
| TW | 201633277 | 9/2016 |
| WO | 0147285 | 6/2001 |

\* cited by examiner

PROJECTION SYSTEM AND METHOD FOR CALIBRATING DISPLAY IMAGE

CROSS-REFERENCE TO RELATED APPLICATION

This application claims the priority benefit of China application serial no. 201710475228.X, filed on Jun. 21, 2017. The entirety of the above-mentioned patent application is hereby incorporated by reference herein and made a part of this specification.

BACKGROUND OF THE INVENTION

Field of the Invention

The invention relates to a projection system and a method for calibrating display image, and particularly relates to a method for calibrating display image on a display screen performed by a projection system.

Description of Related Art

Figure 1:
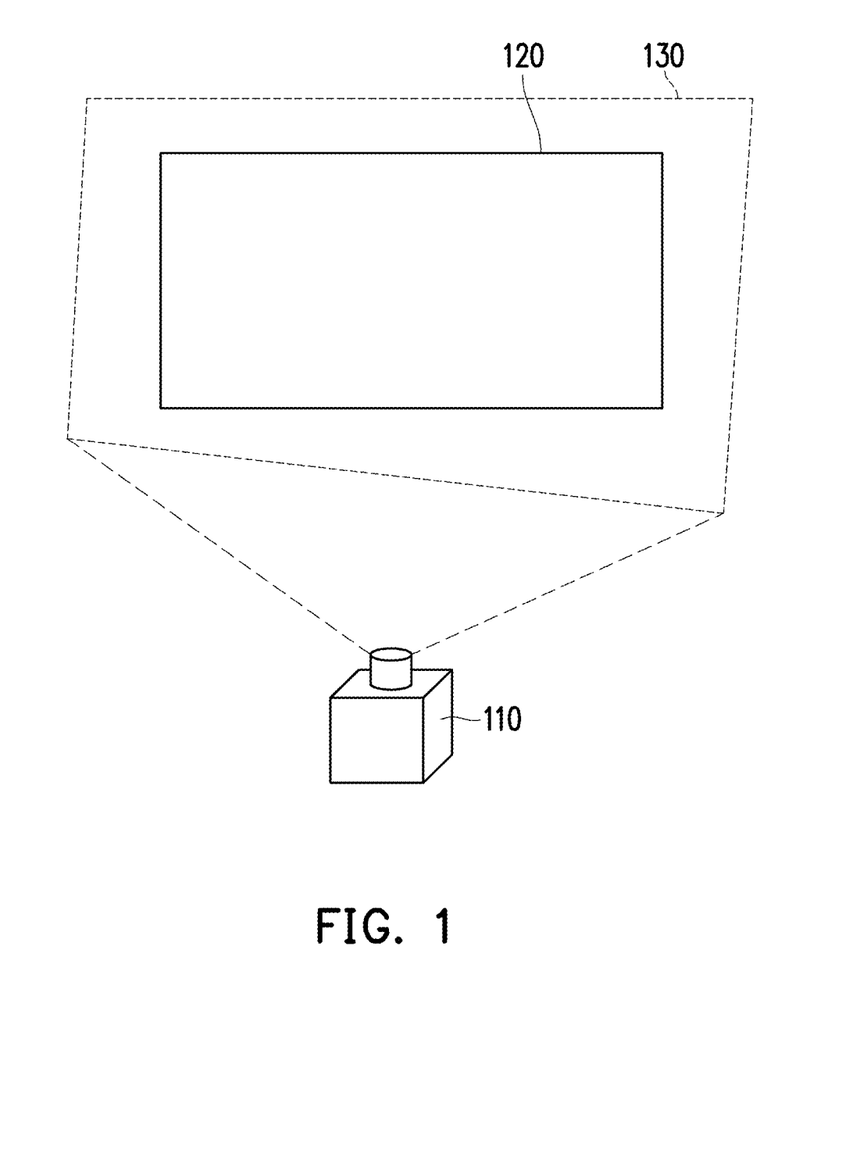
FIG. 1 is a schematic diagram of a projection status of a known projection system.

In a projection system, a projection screen serving as a display screen is a surface structure made of a special material, such that a projected image has good contrast and saturation to provide good display quality. Referring to FIG. 1, which illustrates a schematic diagram of a projection status of a conventional projection system. In a conventional art, a display image 130 projected by a projector 110 is unnecessary to be integrally displayed on a display screen 120. As shown in FIG. 1, a size of the display image 130 is greater than a size of the display screen 120, and most of a periphery region of the display image 130 is displayed outside the display screen 120, which decreases the display quality of the display image 130.

In the conventional art, in order to integrally and correspondingly display the display image 130 on the display screen 120, a user has to perform adjustment operations to the projector 110 in at least four directions in a manual manner for implementation, which are respectively adjustment of a frame size of the projected display image; adjustment of a frame up and down balance of the display image 130; adjustment of a frame left and right balance of the display image 130, and adjustment of a frame horizontality of the display image 130. Namely, the conventional art has to spend a lot of time to integrally display the display image 130 on the display screen 120, such that the size of the display image is substantially equal to the size of the display screen 120, so as to provide better display quality.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention is directed to a projection system and a method for calibrating a display image thereof, which are adapted to adjust the display image according to a size of a display screen.

In order to achieve one or a portion of or all of the objects or other objects, an embodiment of the invention provides a method for calibrating display image including: setting a correction image having N identification patterns, and establishing first coordinate information of the identification patterns, where N is a positive integer greater than 3; using a projection device to project the correction image on a display screen; performing an image capturing operation to the correction image and the display screen to obtain a captured image; calculating second coordinate information of the identification patterns in the captured image, and calculating coordinate translation information according to the first coordinate information and the second coordinate information; calculating boundary information of the display screen according to a plurality of boundary coordinate values of the display screen in the captured image and the coordinate translation information, such that the projection device adjusts a size of a projection image for corresponding to the display screen according to the boundary information.

In order to achieve one or a portion of or all of the objects or other objects, an embodiment of the invention provides a projection system including a projection device, an image capturing device and a controller. The projection device projects a correction image on a display screen. The image capturing device is coupled to the projection device, and performs an image capturing operation to the correction image and the display screen to obtain a captured image. The controller is coupled to the projection device and the image capturing device, and is configured to calculate second coordinate information of identification patterns in the captured image, and calculate coordinate translation information according to first coordinate information and the second coordinate information; and adjust a size of a projection image projected by the projection device for corresponding to the display screen according to boundary information.

According to the above description, the embodiments of the invention have at least one of following advantages or effects. The correction image having N identification patterns is established, and the identification patterns are projected on the display screen. By capturing the identification patterns on the display screen, the coordinate translation information is established according to original coordinate information of the identification patterns and coordinate information of the identification patterns in the captured image. In this way, based on the coordinate translation information, a position relationship between the projection image and the boundary of the actual display screen is calculated according to a position of the boundary of the display screen in the captured image. Therefore, the size of the projection image can be adjusted for corresponding to the display screen, such that the projection image can be quickly and automatically aligned with the edge of the display screen to provide the projection image with better quality.

Other objectives, features and advantages of the invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 2:
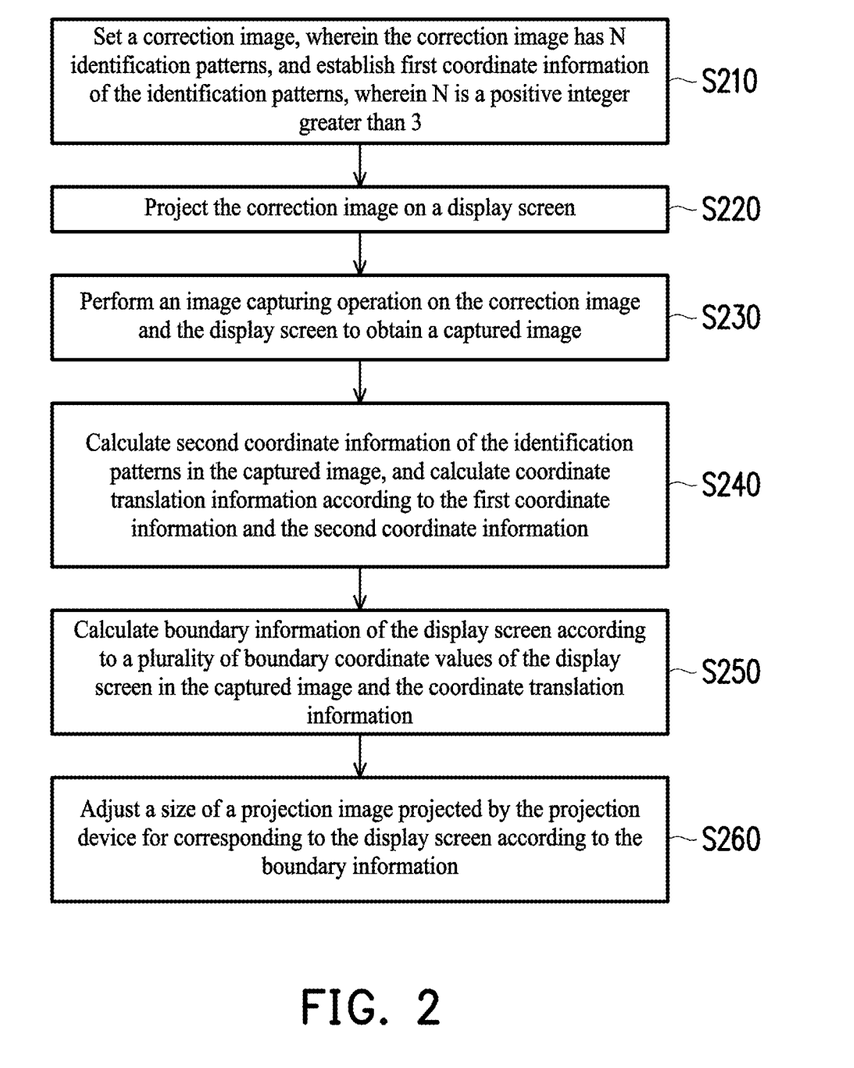
FIG. 2 is a flowchart illustrating a method for correcting display image according to an embodiment of the invention.

Referring to FIG. 2, FIG. 2 is a flowchart illustrating a method for correcting display image according to an embodiment of the invention. The method for calibrating a display image is adapted to a projection system. The projection system may include a projection device and a display screen, which are described in detail later. The method for calibrating the display image includes following steps. In step S210, a correction image is set, where the correction image has N or more identification patterns, where N is greater than 3, and first coordinate information of the identification patterns in a first coordinate system is established. The identification patterns may be geometric figures and may be disposed at a plurality of corner regions of the correction image. The first coordinate information may be coordinate values of geometric centers of the identification patterns in the first coordinate system. In another embodiment, the identification patterns may be four lines connected to form a rectangle, and the first coordinate information is coordinate values of connection points of every two adjacent lines. The step S210 is a step of pre-establishing the first coordinate information of the identification patterns in the first coordinate system, which is described in detail below.

On the other hand, compared to the identification patterns, the correction image may have another background pattern, and the identification patterns have relatively high contrast compared to the background pattern.

Then, in step S220, the projection device projects the correction image set in the step S210 on the display screen. The identification patterns may be all projected on the display screen or a part of or all of the identification patterns are projected outside the display screen, i.e. the identification patterns may be projected on a plane (a wall surface) on which the display screen is erected, though the invention is not limited thereto. Moreover, in step S230, an image capturing operation is performed to the correction image and the display screen to obtain a captured image, i.e. the captured image may include the plane (the wall surface) on which the display screen is erected for covering all of the identification patterns. In step S240, second coordinate information of the identification patterns of the captured image in a second coordinate system is calculated, and coordinate translation information is calculated according to the first coordinate information and the second coordinate information in different coordinate systems. The coordinate translation information may be a translation function, and the translation function represents a relationship between the first coordinate system and the second coordinate system in a matrix.

In step S250, boundary information of the display screen is calculated according to a plurality of boundary coordinate values of the display screen in the captured image and the coordinate translation information generated in the step S240, where coordinate values of a plurality of corners of the display screen in the captured image may be calculated according to the captured image, and coordinate values of a plurality of corners of the display screen in the first coordinate system are generated according to the coordinate translation information. In this way, the boundary information of the display screen in the first coordinate system is obtained.

In the step S250, in case that the boundary information of the display screen in the first coordinate system is obtained, in step S260, the projection device adjusts a size of a projection image to be projected for corresponding to the display screen according to the boundary information obtained in the step S250, so as to generate the projection image aligned with the boundary of the display screen.

Figure 3A:
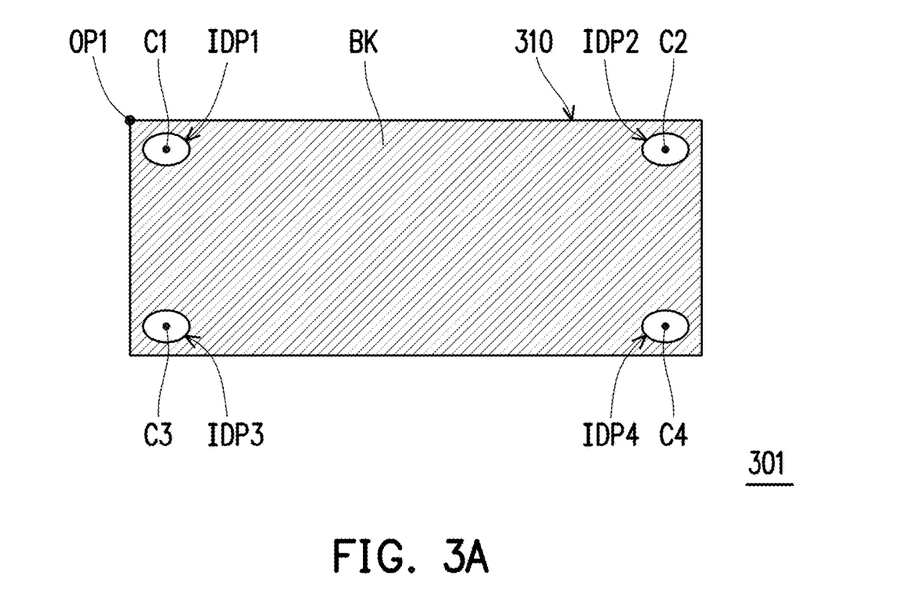
FIG. 3A and FIG. 3B are schematic diagrams of a correction image having different identification patterns according to an embodiment of the invention.
Figure 3B:
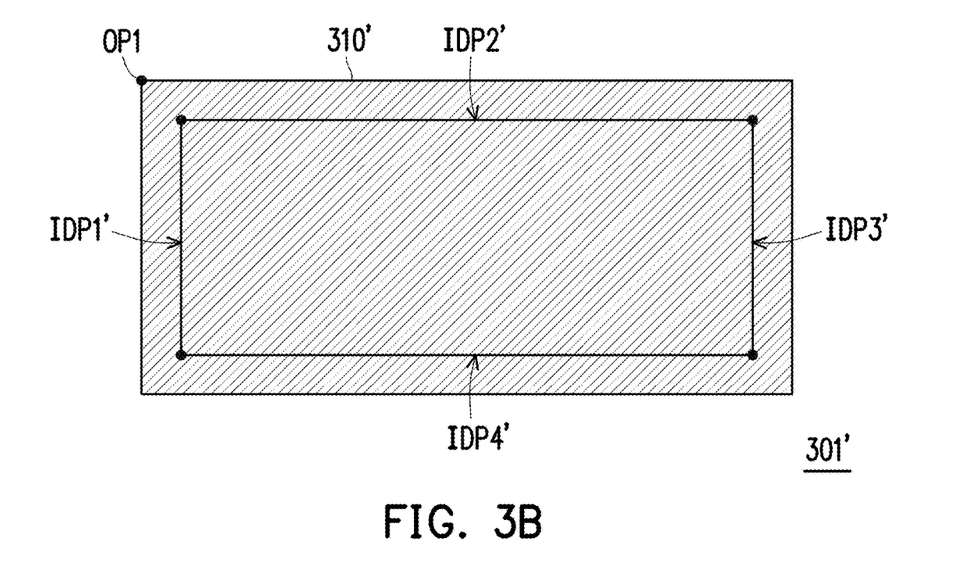

Referring to FIG. 3A and FIG. 3B for implementation details of various steps of the embodiment, FIG. 3A and FIG. 3B are schematic diagrams of a correction image having different identification patterns according to an embodiment of the invention. Referring to the embodiment of FIG. 3A, regarding the step S210, the correction image 310 may be a rectangular image having a background BK and a plurality of identification patterns IDP1-IDP4. According to the correction image 310, the projection device may project a projection image 301, for example, the projection image 301 is the correction image 310. The identification patterns IDP1-IDP4 have higher contrast compared with the background BK, such that the identification patterns IDP1-IDP4 are easy to implement visual identification. For example, the background BK may have a gray color or a black color, and the identification patterns IDP1-IDP4 may have a white color, or vice versa. Certainly, the correction image 310 may also be a non-rectangular image with any shape, and the colors of the background BK and the identification patterns IDP1-IDP4 are not particularly specified, which may be arbitrarily adjusted by a designer.

In the embodiment, the number of the identification patterns IDP1-IDP4 is, for example, four, and the identification patterns IDP1-IDP4 are respectively disposed on four corner regions of the correction image 310. A shape of each of the identification patterns IDP1-IDP4 may be a round shape or any other geometric shape, and the shapes of the identification patterns IDP1-IDP4 are unnecessary to be the same. Moreover, the identification patterns IDP1-IDP4 are unnecessary to be dispose on the four corner regions of the correction image, but may also be disposed in symmetrical to a center point of the correction image 310, or disposed without symmetrical to the center point of the correction image 310, which is not limited by the invention.

When the first coordinate system is established, one of the plurality of corners of the correction image 310 may be set as an original point (for example, the upper left corner of the correction image 310 is set as the original point OP1). Then, coordinate values of geometric centers C1-C4 of the identification patterns IDP1-IDP4 are calculated through image processing, so as to establish the first coordinate information of the identification patterns IDP1-IDP4 in the first coordinate system.

Referring to the embodiment of FIG. 3B, the correction image 310' has a plurality of identification patterns IDP1'-IDP4', where the identification patterns IDP1'-IDP4' are four lines, and the identification patterns IDP1'-IDP4' may form a rectangle. According to the correction image 310', the projection device may correspondingly project the projection image 301'. When the first coordinate system is established, one of the plurality of corners of the correction image 310' may be set as an original point (for example, the upper left corner of the correction image 310' is set as the original point OP1). Then, coordinates of connection points of every two adjacent identification patterns IDP1'-IDP4' are calculated through image processing, so as to establish the first coordinate information of the identification patterns IDP1'-IDP4' in the first coordinate system.

Figure 4:
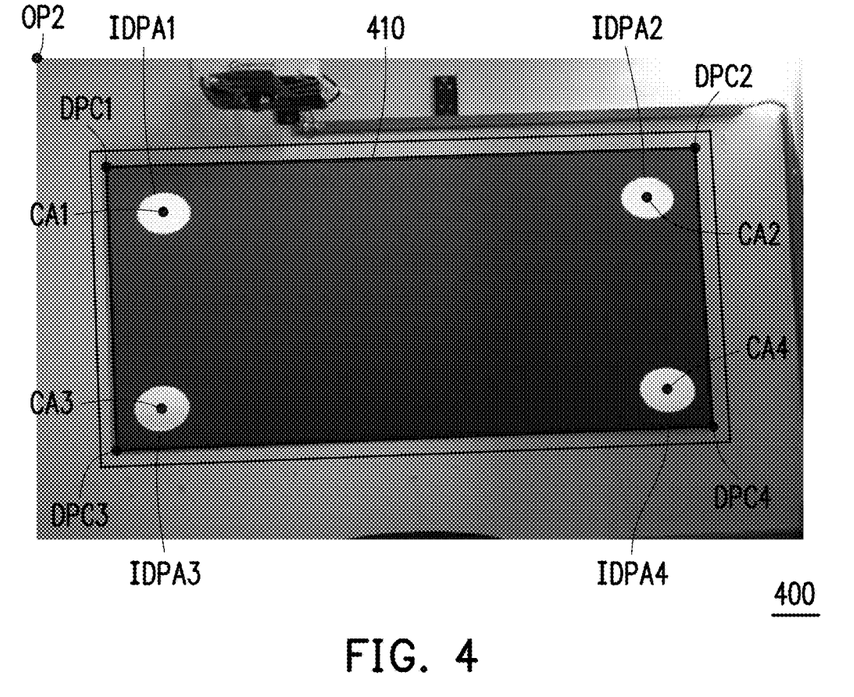
FIG. 4 is a schematic diagram of a captured image according to an embodiment of the invention.

Referring to FIG. 4 for implementation details of the steps S230-S250, and FIG. 4 is a schematic diagram of a captured image according to an embodiment of the invention. The correction image of the embodiment is the correction image 310 of FIG. 3A, and the correction image 310 is projected to a display screen 410 through the projection device. Moreover, the image capturing operation may be executed by an electronic device outside the projection device, or may be executed by an image capturing device configured on the projection device. The captured image 400 includes the display screen 410 and identification patterns IDPA1-IDPA4. Moreover, any corner of the captured image 400 may be set as an original point (for example, the upper left corner of the captured image 400 is set as the original point OP2) to establish a second coordinate system.

The identification patterns IDPA1-IDPA4 in the captured image 400 are identified through image processing, and coordinate values of geometric centers CA1-CA4 of the identification patterns IDPA1-IDPA4 in the second coordinate system are calculated, so as to obtain second coordinate information of the identification patterns IDPA1-IDPA4 in the captured image 400. In the embodiment, the identification patterns IDPA1-IDPA4 in the captured image 400 are all located in the display screen 410, and the second coordinate information of the identification patterns IDPA1-IDPA4 calculated according to such configuration is more accurate. In other embodiments, the identification patterns may be partially or totally located outside the display screen, which is not limited by the invention.

In this way, coordinate translation information between the first coordinate system and the second coordinate system may be calculated according to the first coordinate information of the identification patterns IDPA1-IDPA4 of the correction image 310 in the first coordinate system and the second coordinate information of the identification patterns IDPA1-IDPA4 in the captured image 400 in the second coordinate system, and the coordinate translation information is described in detail below.

Taking the contents illustrated in FIG. 3A and FIG. 4 as an example, it is assumed that the coordinate values of the geometric centers C1-C4 of the identification patterns IDP1-IDP4 in the first coordinate system are respectively (538, 786), (2600, 709), (530, 1779), (2687, 1683), and the coordinate values of the geometric centers CA1-CA4 of the identification patterns IDPA1-IDPA4 in the captured image 400 in the second coordinate system are respectively (260, 203), (1674, 203), (260, 890), (1674, 890), the coordinate translation information, for example, a matrix between the first coordinate system and the second coordinate system is calculated as follow:

$$\begin{bmatrix} 0.674321 & 0.025942 & 0 & -0.000005 \\ 0.017670 & 0.733943 & 0 & 0.000047 \\ 0 & 0 & 1 & 0 \\ -116.673432 & -387.835892 & 0 & 0.965977 \end{bmatrix}$$

Four corners DPC1-DPC4 of the display screen 410 in the captured image 400 are identified through image processing, and boundary coordinate values of the fourth corners DPC1-DPC4 of the display screen 410 in the second coordinate system are calculated. By substituting the boundary coordinate values into the aforementioned coordinate translation information for operation, the boundary information of the four corners of the display screen in the first coordinate system is obtained, and in the embodiment, translation coordinate values of the four corners of the display screen in the first coordinate system are obtained. The coordinate values of the four corners DPC1-DPC4 of the display screen 410 in the captured image 400 may be obtained by identifying connections of every two adjacent sides of the display screen 410. On the other hand, in other embodiments, center points (not shown) of four sides of the display screen 410 in the captured image 400 may be identified through image processing, and boundary coordinate values of the center points of the four sides of the display screen 410 in the second coordinate system are calculated, though the invention is not limited thereto.

For example, referring to the content illustrated in FIG. 4, when the coordinate values of the four corners DPC1-DPC4 of the display screen 410 in the captured image 400 are respectively (300, 561), (2794, 466), (346, 1979), (2862, 1852), by respectively operating (for example, to perform a multiplication operation on) the coordinate values of the corners DPC1-DPC4 with the coordinate translation information, the coordinate values of the four corners of the display screen in the first coordinate system may be calculated, which are respectively (96, 32), (1826, 27), (143, 1016), (1799, 1008).

After the boundary information of the display screen in the first coordinate system is obtained, the projection device may perform an image processing operation to the subsequently projected projection image in advance according to the boundary information, and re-scales the projection image through the image processing, so as to generate adjusted image data. The above image processing is a processing method adopted by related technician of the field to identify or determine coordinate information of an object in the image and adjust a display size of the image through related software or an image processing circuit.

Figure 5:
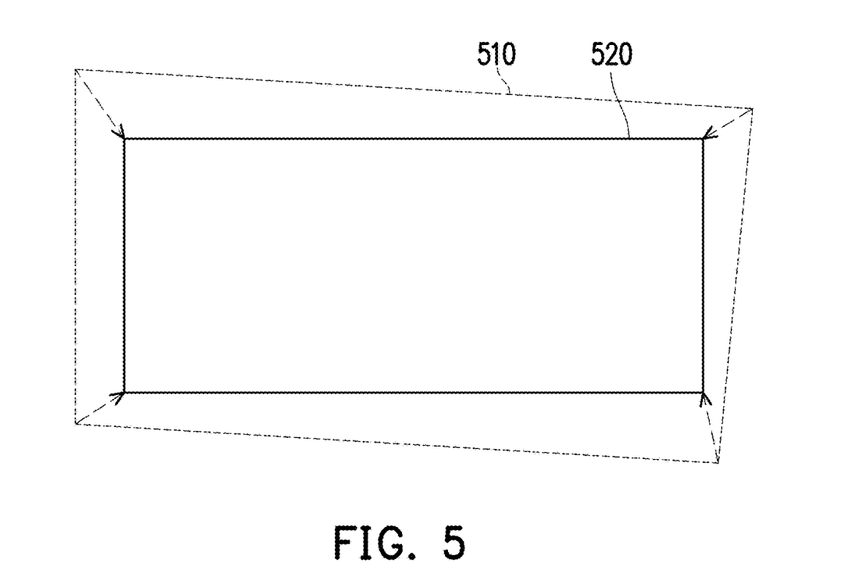
FIG. 5 is a schematic diagram of size adjustment of a projection image according to an embodiment of the invention.

Referring to FIG. 5, FIG. 5 is a schematic diagram of size adjustment of a projection image according to an embodiment of the invention. In FIG. 5, an original size of a projection image 510 is greater than a display screen 520, and four sides of the projection image 510 are not parallel to corresponding four sides of the display screen 520. By executing the step S260, the original size of the image data of the projection image 510 may be adjusted (reduced) to obtain adjusted image data, and four sides of the adjusted projection image 510 may be aligned with the corresponding four sides of the display screen 520. In this way, the projection image 510 may be integrally and maximally projected on the display screen 520, so as to achieve an optimal display effect.

Certainly, the size adjustment of the projection image 510 may also be implemented by enlarging the original size of the projection image 510. The aforementioned image size adjustment operation is unnecessary to perform scaling adjustment on all of sides of the projection image 510 by a same scaling ratio, but is to perform size adjustment according to the four sizes (four corners) of the display screen 520, such that the four sides of the projection image 510 may be aligned with the corresponding four sides of the display screen 520.

Figure 6A:
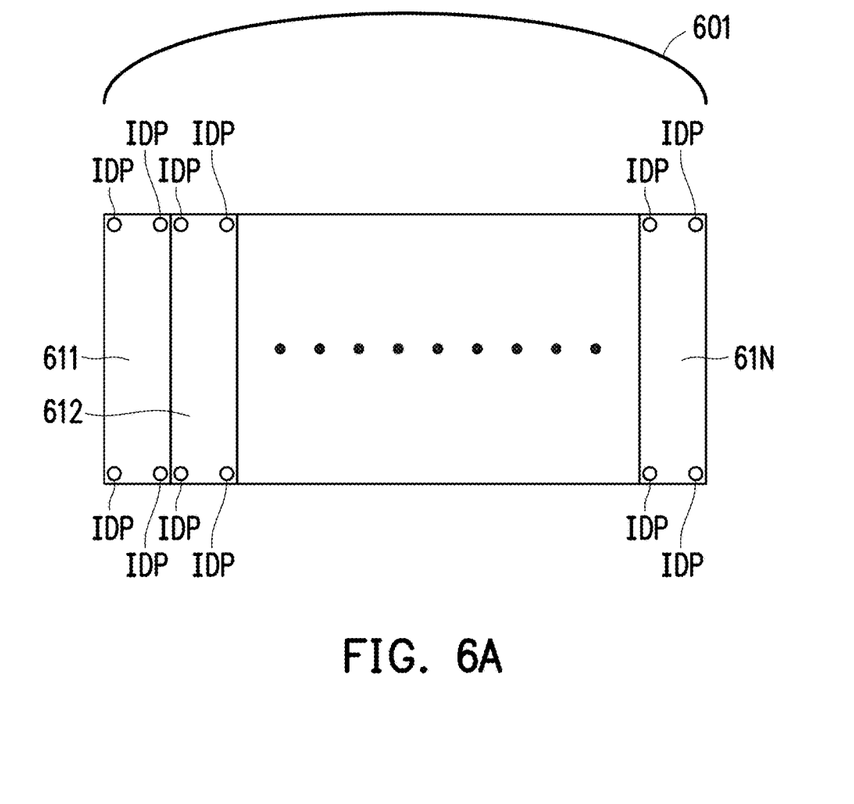
FIG. 6A to FIG. 6C are schematic diagrams of a plurality of different correction images according to an embodiment of the invention.
Figure 6B:
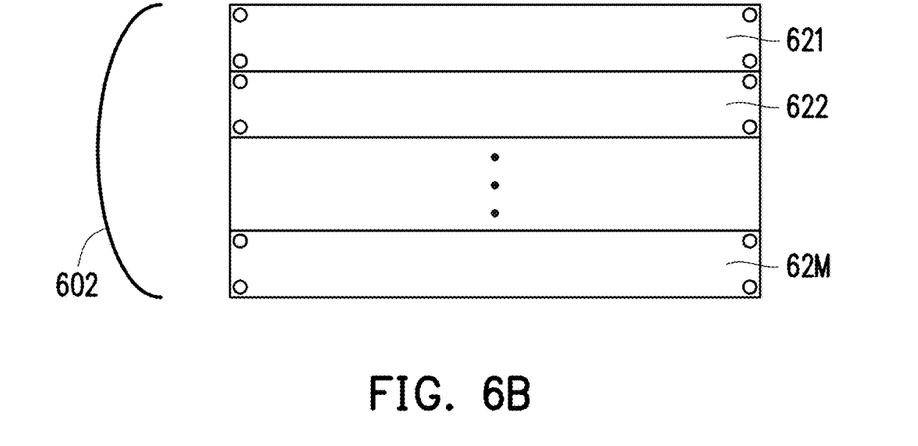
Figure 6C:
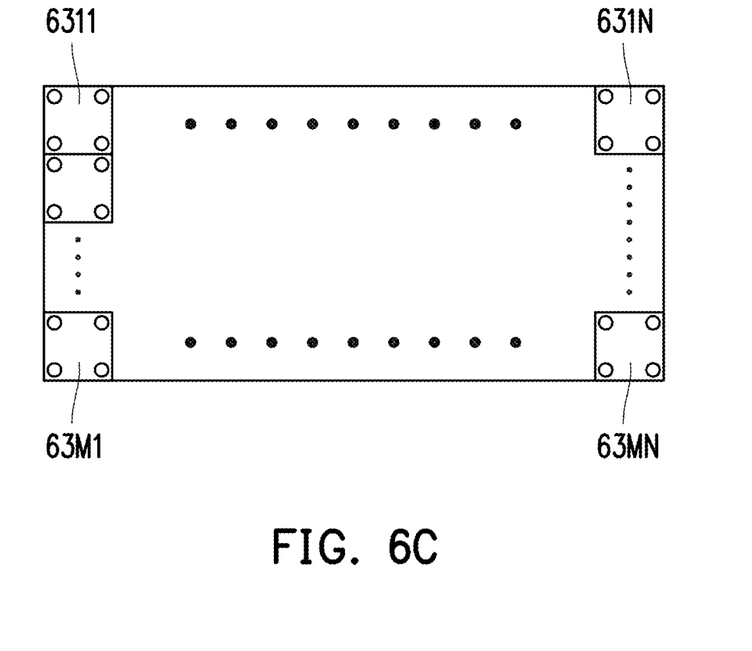

Referring to FIG. 6A to FIG. 6C, FIG. 6A to FIG. 6C are schematic diagrams of a plurality of different correction images according to an embodiment of the invention. The correction image may include a plurality of sub correction images. In FIG. 6A, when a lateral extending direction of a display screen 601 in the projection system is a display screen of a curved surface, the correction image may include a plurality of sub correction images 611-61N extending longitudinally. Moreover, four corner regions of each of the sub correction images 611-61N are respectively disposed with identification patterns IDP, though disposing positions of the identification patterns IDP are not limited by the invention. For example, the identification patterns IDP may also be disposed on the centers of the four sides of the sub correction images. Through the sub correction images 611-61N, the influence of the non-linear status of the display screen 601 with the curved surface on the coordinate translation information is mitigated, so as to improve the accuracy of the coordinate translation information. The identification patterns IDP are, for example, rounds, though the invention is not limited thereto.

It should be noted that the sizes of the sub correction images 611-61N may be different. The size of each of the sub correction images 611-61N may be set according to a curvature of the corresponding position on the display screen 601. For example, the size of each of the sub correction images 611-61N may be inversely proportional to the curvature of the corresponding position on the display screen 601. Moreover, the image capturing device captures an image including the display screen 601, and the captured image including the display screen 601 is analyzed through image processing to obtain the curvatures of the corresponding positions on the display screen 601, so as to change the size of each of the sub correction images 611-61N. Moreover, the user may obtain the curvatures of the corresponding positions on the display screen 601, and manually set the size of each of the sub correction images 611-61N, though the invention is not limited thereto.

In FIG. 6B, when the longitudinal extending direction of the display screen 602 in the projection system is a display screen of a curved surface, the correction image may include a plurality of sub correction images 621-62M extending laterally. Moreover, four corner regions of each of the sub correction images 621-62M are respectively configured with identification patterns, so as to improve the accuracy of the coordinate translation information. The identification patterns are, for example, rounds, though the invention is not limited thereto.

Similarly, the sizes of the sub correction images 621-62M may also be different. The size of each of the sub correction images 621-62M may be set according to a curvature of the corresponding position on the display screen 602. For example, the size of each of the sub correction images 621-62M may be inversely proportional to the curvature of the corresponding position on the display screen 602.

In FIG. 6C, the correction image may include a plurality of sub correction images 6311-63MN arranged in an array. Such type of the correction image may be applied to a display screen with a spherical surface, so as improve the accuracy of the coordinate translation information. Moreover, the sizes of the sub correction images 6311-63MN may also be different. The size of each of the sub correction images 6311-63MN may be set according to a curvature of the corresponding position on the display screen. For example, the size of each of the sub correction images 6311-63MN may be inversely proportional to the curvature of the corresponding position on the display screen.

Figure 7:
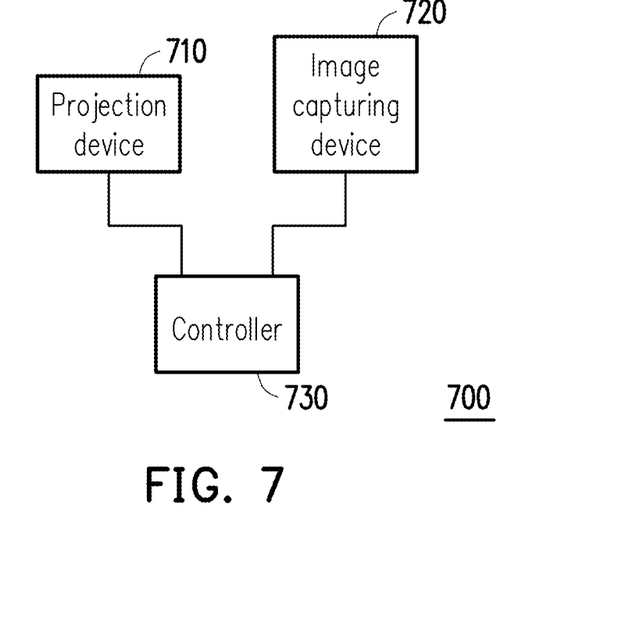
FIG. 7 is a schematic diagram of a projection system according to an embodiment of the invention.

Referring to FIG. 7, FIG. 7 is a schematic diagram of a projection system according to an embodiment of the invention. The projection system 700 includes a projection device 710, an image capturing device 720 and a controller 730. The projection device 710 is configured to project a projection image including a correction image on a display screen. The image capturing device 720 is coupled to the projection device 710 through a wired or wireless manner, and performs an image capturing operation to the correction image and the display screen to obtain a captured image. The controller 730 is coupled to the projection device 710 and the image capturing device 720. The controller 730 presets a correction image having three or more identification patterns, and establishes first coordinate information of the identification patterns in the first coordinate system, and calculates second coordinate information of the identification patterns of the captured image in the second coordinate system, and calculates coordinate translation information between the first coordinate system and the second coordinate system according to the first coordinate information and the second coordinate information. The controller 730 further calculates boundary information of the display screen in the first coordinate system according to a plurality of boundary coordinate values of the display screen of the captured image in the second coordinate system and the coordinate translation information, for example, the coordinate values of the four corners of the display screen in the first coordinate system. When the projection system 700 is about to perform the image projection operation, the controller 730 adjusts the size of the projection image to be projected for corresponding to the display screen according to the boundary information of the display screen in the first coordinate system, and drives the projection device 710 to perform the image projection operation according to the adjusted image data. In this way, a plurality of sides of the projection image projected on the display screen may be respectively aligned with the corresponding sides of the display screen, so as to improve the display quality. Moreover, the controller 730 may include a memory to store the correction image including the identification patterns, the related coordinate information and the coordinate translation information, etc. It should be noted that setting of the correction image mentioned in the step S210 is implemented in the controller 730 in advance, and establishment of the first coordinate information of the identification patterns is also implemented in advance, and after the step S210 is completed, the correction image and the first coordinate information may be stored in the memory of the projection system. However, the invention is not limited thereto. For example, FIG. 6A to FIG. 6C are schematic diagrams respectively illustrating different correction images according to an embodiment of the invention, and curvatures of the display screen are required to be confirmed in order to determine the correction image and establish the first coordinate information of the identification patterns, so that based on user's demand, each time when the correction is performed, the correction image is reset and the first coordinate information of the identification patterns is established.

In the embodiment, the image capturing device 720 and the projection device 710 may be set in a same host. Alternatively, the image capturing device 720 may also be set on an external electronic device, where the electronic device is, for example, a handheld electronic device (for example, a digital camera, a smart phone, a tablet computer, a notebook computer, etc.). The image capturing device 720 may be an embedded camera device on the handheld electronic device, an independent camera or any image capturing device well known by a person skilled in related art. Moreover, the projection device 710 may be an independent projector, or any embedded projection optical engine device on the electronic device. The projection device 710 may be implemented by any hardware capable of executing the image projection operation and well known by the person skilled in the art, which is not limited by the invention.

Moreover, the controller 730 is a processor having a computation function. Alternatively, the controller 730 may be a hardware circuit designed by using hardware description language (HDL) or any digital circuit design method well known by related technicians of the field, and implemented through a field programmable gate array (FPGA), a complex programmable logic device (CPLD) or an application-specific integrated circuit (ASIC). Moreover, the memory may be a random access memory (RAM), a read-only memory (ROM), etc., which is not limited by the invention.

Figure 8A:
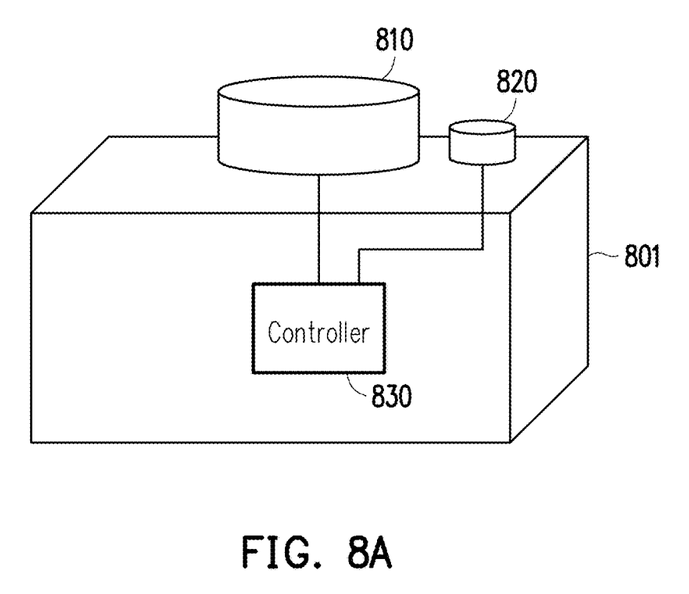
FIG. 8A and FIG. 8B are schematic diagrams of different implementations of a projection system according to an embodiment of the invention.
Figure 8B:
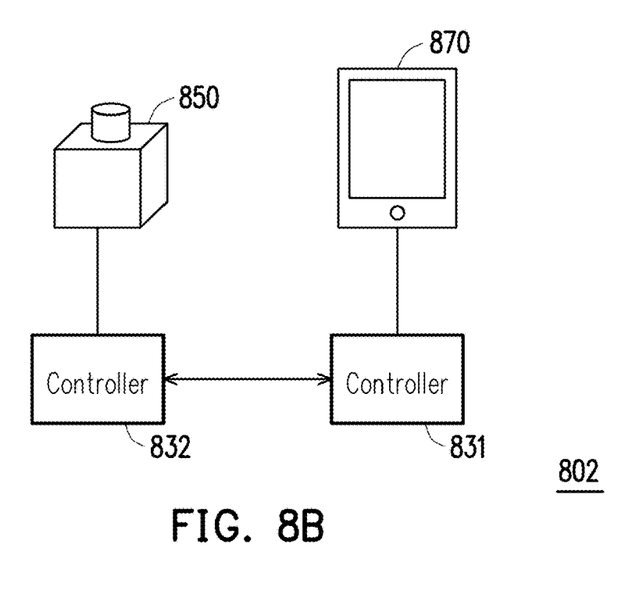

Referring to FIG. 8A and FIG. 8B, FIG. 8A and FIG. 8B are schematic diagrams of different implementations of a projection system according to an embodiment of the invention. In FIG. 8A, the projection system 801 includes a projection device 810, an image capturing device 820 and a controller 830. In the embodiment, the image capturing device 820 and the projection device 810 are configured in the same projection system 801, i.e. the image capturing device 820, the projection device 810 and the controller 830 are disposed in a same casing. By using the controller 830 to calculate the coordinate translation information, the projection image generated by the projection device 810 may be integrally displayed on the display screen to provide good display quality.

Operation details of the projection device 810, the image capturing device 820 and the controller 830 have been described in the aforementioned embodiment, and details thereof are not repeated.

In FIG. 8B, the projection system 802 includes a projection device 850, an image capturing device disposed on a handheld electronic device 870, a controller 831 and a controller 832. In the embodiment, the controller 832 is disposed in the projection device 850, and the controller 831 is disposed in the handheld electronic device 870. The projection device 850 communicates with the handheld electronic device 870 in a wired or wireless manner, so as to exchange information between the controller 831 and the controller 832. The projection device 850 and the handheld electronic device 870 are two independent devices.

It should be noted that in the present embodiment, the controller 831 is configured to set a correction image and establish a first coordinate system and the first coordinate information of the identification patterns on the correction image in the first coordinate system. The first coordinate information of the identification patterns on the correction image in the first coordinate system may be stored in the controller 831 of the handheld electronic device 870 or in any type of storage device. Moreover, the handheld electronic device 870 obtains a captured image through an embedded image capturing device, and the controller 831 establishes a second coordinate system according to the captured image, and calculates second coordinate information of the identification patterns of the captured image in the second coordinate system, and calculates coordinate translation information according to the first coordinate information and the second coordinate information, and calculates boundary information of the display screen in the first coordinate system according to boundary coordinate values of the display screen of the captured image in the second coordinate system and the coordinate translation information.

The controller 831 of the handheld electronic device 870 transmits the boundary information of the display screen in the first coordinate system to the controller 832 of the projection device 850. The controller 832 of the projection device 850 scales up or down an original size of image data of a projection image according to the boundary information of the display screen in the first coordinate system, so as to obtain adjusted image data, and the projection device 850 produces the projection image aligned with the display screen.

It should be noted that the image data of the correction image is also stored in any type of storage device in the projection device 850, and the projection device 850 projects the correction image on the display screen.

Moreover, the correction operation of displaying the correction image may be activated by executing an inbuilt application in the handheld electronic device 870. By activating the application, the controller 831 of the handheld electronic device 870 may directly drive the projection device 850 to automatically project the correction image stored in the projection device 850. Moreover, after the controller 831 of the handheld electronic device 870 calculates the boundary information of the display screen in the first coordinate system, the controller 831 of the handheld electronic device 870 may transmit the above boundary information to the controller 832 of the projection device 850, and the application drives the controller 832 of the projection device 850 to execute the operation of adjusting the size of the projection image.

In summary, the correction image is projected on the display screen, and the captured image of the correction image and the display screen is obtained. By establishing a translation relationship between different coordinate systems of the original correction image and the captured image, the boundary information of the display screen is calculated. Moreover, according to the boundary information of the display screen, the size of the projection image may be adjusted for corresponding to the display screen, so as to align the projection image with the display screen to improve display quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method for calibrating a projection image, adapted to be displayed by a projection system, wherein the projection system comprises a projection device and a display screen, the method for calibrating the projection image comprising:

driving the projection device to automatically project a correction image by activating an application built in a handheld electronic device;

projecting a correction image on the display screen by using the projection device, wherein the correction image has N identification patterns, and N is a positive integer greater than 3;

performing an image capturing operation on the correction image and the display screen to obtain a captured image by an image capturing device configured in the handheld electronic device;

calculating second coordinate information of the identification patterns in the captured image, and calculating coordinate translation information according to first coordinate information of the identification patterns and the second coordinate information;

calculating boundary information of the display screen according to a plurality of boundary coordinate values of the display screen in the captured image and the coordinate translation information; and adjusting a size of the projection image by the projection device for corresponding to the display screen according to the boundary information.

2. The method for calibrating the projection image as claimed in claim 1, wherein the first coordinate information of the identification patterns is geometric centers of the identification patterns established in the first coordinate system according to the correction image.

3. The method for calibrating the projection image as claimed in claim 2, wherein the step of calculating the second coordinate information of the identification patterns in the captured image comprises:

establishing the second coordinate system according to the captured image, and calculating the second coordinate information of the geometric centers of the identification patterns of the captured image in the second coordinate system.

4. The method for calibrating the projection image as claimed in claim 3, wherein the step of calculating the boundary information of the display screen according to the boundary coordinate values of the display screen in the captured image and the coordinate translation information comprises:

calculating the boundary coordinate values of a plurality of corners of the display screen of the captured image in the second coordinate system; and translating the boundary coordinate values according to the coordinate translation information to obtain a plurality of translation coordinate values of the corners of the display screen in the first coordinate system, and obtain the corresponding boundary information.

5. The method for calibrating the projection image as claimed in claim 4, wherein the step of adjusting the size of the projection image by the projection device for corresponding to the display screen according to the boundary information comprises:

scaling an original size of image data of the projection image according to the translation coordinate values to obtain adjusted image data; and performing a projection operation according to the adjusted image data.

6. The method for calibrating the projection image as claimed in claim 1, wherein the step of projecting the correction image on the display screen comprises:

making the identification patterns to display in the display screen.

7. The method for calibrating the projection image as claimed in claim 6, wherein the identification patterns are respectively disposed on a plurality of corner regions of the correction image.

8. The method for calibrating the projection image as claimed in claim 1, wherein the step of setting the correction image further comprises:
dividing the correction image into a plurality of sub correction images; and
respectively disposing the identification patterns on a plurality of corner regions of the plurality of sub correction images.

9. A projection system, comprising:
a projection device, projecting a correction image on a display screen;
an image capturing device, coupled to the projection device, and performing an image capturing operation to the correction image and the display screen to obtain a captured image, wherein the image capturing device is configured in a handheld electronic device, an application is built in the handheld electronic device, and the application of the handheld electronic device is activated to drive the projection device to automatically project the correction image;
a controller, coupled to the projection device and the image capturing device, and configured to:
set the correction image, wherein the correction image has N identification patterns, and establish first coordinate information of the identification patterns, wherein N is a positive integer greater than 3;
calculate second coordinate information of the identification patterns in the captured image, and calculate coordinate translation information according to the first coordinate information and the second coordinate information;
calculate boundary information of the display screen according to a plurality of boundary coordinate values of the display screen in the captured image and the coordinate translation information; and
adjust a size of a projection image projected by the projection device for corresponding to the display screen according to the boundary information.

10. The projection system as claimed in claim 9, wherein the controller comprises a first controller and a second controller,
the first controller is disposed in the handheld electronic device, coupled to the image capturing device, and configured to:
set the correction image, and establish the first coordinate information of the identification patterns;
calculate the second coordinate information of the identification patterns in the captured image, and calculate the coordinate translation information according to the first coordinate information and the second coordinate information
calculate boundary information of the display screen according to the boundary coordinate values of the display screen in the captured image and the coordinate translation information;
the second controller is coupled to the first controller of the handheld electronic device and the projection device, and is configured to receive the boundary information from the handheld electronic device, and adjust the size of the projection image for corresponding to the display screen according to the boundary information.

11. The projection system as claimed in claim 9, wherein the controller establishes a first coordinate system according to the correction image, and calculates first coordinate information of geometric centers of the identification patterns in the first coordinate system.

12. The projection system as claimed in claim 11, wherein the controller establishes a second coordinate system according to the captured image, and calculates second coordinate information of geometric centers of the identification patterns of the captured image in the second coordinate system.

13. The projection system as claimed in claim 12, wherein the controller calculates the boundary coordinate values of a plurality of corners of the display screen of the captured image in the second coordinate system, and translate the boundary coordinate values according to the coordinate translation information to obtain a plurality of translation coordinate values of the corners of the display screen in the first coordinate system, and obtain the boundary information.

14. The projection system as claimed in claim 13, wherein the controller scales the original size of image data of the projection image according to the translation coordinate values, so as to obtain adjusted image data.

15. The projection system as claimed in claim 11, wherein the projection device displays the identification patterns in the display screen.

16. The projection system as claimed in claim 15, wherein the identification patterns are respectively disposed on a plurality of corner regions of the correction image.

17. The projection system as claimed in claim 9, wherein the controller divides the correction image into a plurality of sub correction images, and respectively disposes the identification patterns on a plurality of corner regions of the plurality of sub correction images.

18. The projection system as claimed in claim 9, wherein the correction image is stored in the projection device, and the first coordinate information of the identification patterns is stored in the image capturing device.

* * * * *